United States Patent [19]

Olsen

[11] Patent Number: 4,909,063

[45] Date of Patent: Mar. 20, 1990

[54] PRESSURE CALIBRATION METHOD AND APPARATUS

[75] Inventor: Everett O. Olsen, Wrentham, Mass.

[73] Assignee: The Foxboro Company, Foxboro, Mass.

[21] Appl. No.: 261,200

[22] Filed: Oct. 24, 1988

[51] Int. Cl.$^4$ ............................................. G01L 27/00
[52] U.S. Cl. ..................................................... 73/4 R
[58] Field of Search ................ 137/557; 417/225–227; 251/129.01, 129.17; 138/30, 31; 73/4 R, 4 D, 4 V

[56] References Cited

U.S. PATENT DOCUMENTS

| | | | |
|---|---|---|---|
| 4,604,891 | 8/1986 | Sgourakes | 73/4 R |
| 4,638,656 | 1/1987 | Sgourakes | 73/4 R |
| 4,681,143 | 7/1987 | Sato et al. | 251/129.1 |
| 4,708,010 | 11/1987 | Sgourakes | 73/4 R |

FOREIGN PATENT DOCUMENTS

| | | | |
|---|---|---|---|
| 0453150 | 1/1913 | France | 417/226 |
| 0223385 | 10/1986 | Japan | 251/129.01 |
| 274 | 7/1912 | United Kingdom | 417/226 |

Primary Examiner—Robert R. Raevis
Attorney, Agent, or Firm—Wigman & Cohen

[57] ABSTRACT

A differential pressure calibrator (with built in overrange protection) using a "dropping ball and weight" technique and a mode unit which eliminates the need for a process manifold is disclosed in the subject invention.

9 Claims, 2 Drawing Sheets

PRESSURE CALIBRATION METHOD AND APPARATUS

TECHNICAL FIELD

The present invention relates generally to measurement validation and pressure sensor calibration, and more particularly to on-line differential pressure sensor calibration.

BACKGROUND ART

Pressure measuring instruments often are installed in places where they are subject to widely varying environmental conditions, such as changing ambient temperatures. Consequently, it is not uncommon for the instrument zero-set and span calibrations to drift or in some way be offset over time, resulting in erroneous readings or measurements in which system operators lack full confidence. Since the instruments frequently are in locations which are not readily accessible to routine maintenance, zero-set and calibration errors in many cases have not been easily correctable by operating personnel. Moreover, calibrating the span of instruments of the kinds available heretofore typically has involved relatively complex, and time-consuming procedures which may interrupt an on-line operation. For these reasons, the confidence level an operator has in the measurements may be less than is desirable.

Because of the importance of minimizing measuring errors, various proposals have been made for solving or ameliorating these problems. For example, remotely-operated zero-set apparatus now is available for use with differential-pressure transmitters. Such apparatus comprises a remotely-controllable pressure manifold which, upon demand, blocks the low-pressure process line and bypasses the high-pressure process to the high and low sides of the transmitter, producing a zero-differential-pressure condition. If under such circumstances the transmitter output signal differs from the indicating zero differential pressure, the measured error value may be stored (as in a computer) and thereafter used to correct the output signal when measurements are resumed.

However, such remote-setting of instrument zero does not correct for the errors in span calibration. Nor does such a correction necessarily enhance operator confidence in measurement accuracy. Thus, in an effort to avoid the defects of such errors, differential pressure-transmitters have been designed to include one or more common-sensing elements (such as temperature and static pressure sensors) arranged to function with associated devices to automatically adjust the transmitter output signal in response to changes in the sensor's ambient conditions. For example, the transmitter output signal may be controllably altered in accordance with a predictive algorithm stored in a microprocessor forming part of such instrument or system.

Although such compensator arrangements have improved the accuracy of the pressure measurement they have not eliminated the problem. In part this is because such techniques are not capable of achieving the desired accuracy, particularly since there remain other uncompensated variables. Thus, the need for instrument recalibration from time to time is not eliminated. Moreover such compensating arrangements are relatively costly to implement. U.S. Pat. Nos. 4,638,656 and 4,604,891, to Sgourakes et al and assigned to the assignee of the present invention, provide a pressure measuring instrument with a control room signal-activatable device for developing a highly accurate and repeatable reference pressure to be applied to the field-based pressure-sensing elements of the instruments. The reference pressure device of these patents comprises a vertically-oriented cylindrical tube containing a fill fluid which communicates with the fill fluid in the instrument. A ferromagnetic ball is raised in the cylinder by an applied electromagnetic field and then released to produce the reference pressure.

The '891 patent discloses a reference-pressure device of the type basically similar to the device disclosed in the '656 patent. However, the '891 patent includes an improvement wherein the magnitude of the reference pressure pulse is substantially increased by suspending an ancillary weight from the ball so as to augment the force supplied to the falling ball. The increase in force, in effect, increases the apparent density of the ball. Since the magnitude of the pressure pulse is proportional to the relative densities of the ball and the fill-liquid, the increase in apparent density correspondingly increases the reference pressure pulse generated.

These known prior art calibration techniques require one or more remotely operated valves and a process manifold.

SUMMARY OF THE INVENTION

The present invention, briefly described, draws upon and expands use of a coil-operated "dropping ball and weight" assembly and incorporates an additional, novel, coil-operated "mode unit." External valves and manifold apparatus are eliminated. The mode unit contains a slack diaphragm mounted in a cylinder between a pair of opposing, spring-loaded bumper elements which may be electrically activated. An electronics control unit which may be field-based, may be used to control the calibration process.

A pair of diaphragms with associated backup plates are subjected to the process fluid. The process diaphragms may be parts of a uniform differential pressure apparatus. Actuation of the mode unit releases the mode unit slack diaphragm, normally held between the bumpers. The slack diaphragm then moves enough to allow the upstream process diaphragm to bottom out against a "high side" backup plate, placing a reference pressure across the differential pressure sensor. A reference pressure results; the reference pressure is the span pressure if the dropping ball has been released, and a zero pressure if the dropping ball has not been released. The spring-loaded bumpers also provide overrange protection for the differential pressure sensor.

A first advantage of this invention is that both "zero" and "span" calibration can be automatically produced by a command signal from a remotely located control room, and may be initiated either manually or automatically, either at a scheduled time (the schedule may be resident in the field-based electronics control unit), or by command upon occurrence of a process condition such as a detected abnormal condition. Human intervention, while possible, is not normally essential.

Another advantage is that, to automatically calibrate for zero and span, no fill fluid valving nor any special additional process fluid manifold switching of any sort is required.

Still another advantage is that automatic zero and span calibration may be achieved in the presence of an applied measurement differential pressure resulting from the process. Automatic zero and span calibrations may be achieved in the presence of process applied static pressure without disturbing the process.

Yet another advantage of this invention is that the reliability of the calibrator and the lifetime of the apparatus according to this invention are expected to be appreciable because no mechanical valves are used in a manifold.

It is advantageously expected that this invention will result in lower expenses. The cost of a pneumatically operated manifold known in the prior art method and apparatus, plus its installation and pneumatic piping, is appreciable. Similarly, the cost of an electrically operated manifold also known in the prior art method and apparatus, plus its wiring and explosion hazard problems, may make such calibrations systems cumbersome and expensive or even inappropriate. The present invention is believed to be more economical and more easily installed.

Avoiding complexity is another advantage of the present invention. The mode unit disclosed also provides overrange protection.

Yet another advantage of this invention is that during calibration, the process in which the instruments are installed is substantially unaffected by the various calibration procedures.

With the above advantages, features, and objects of the invention in view, and others that may become more apparent hereinafter, the nature of the invention will become more clearly understood by reference to the attached drawings, the following detailed description thereof, and the appended claimed subject matter.

BRIEF DESCRIPTION OF THE DRAWING FIGURES

DETAILED DESCRIPTION OF THE PREFERRED EMBODIMENT

Figure 1:
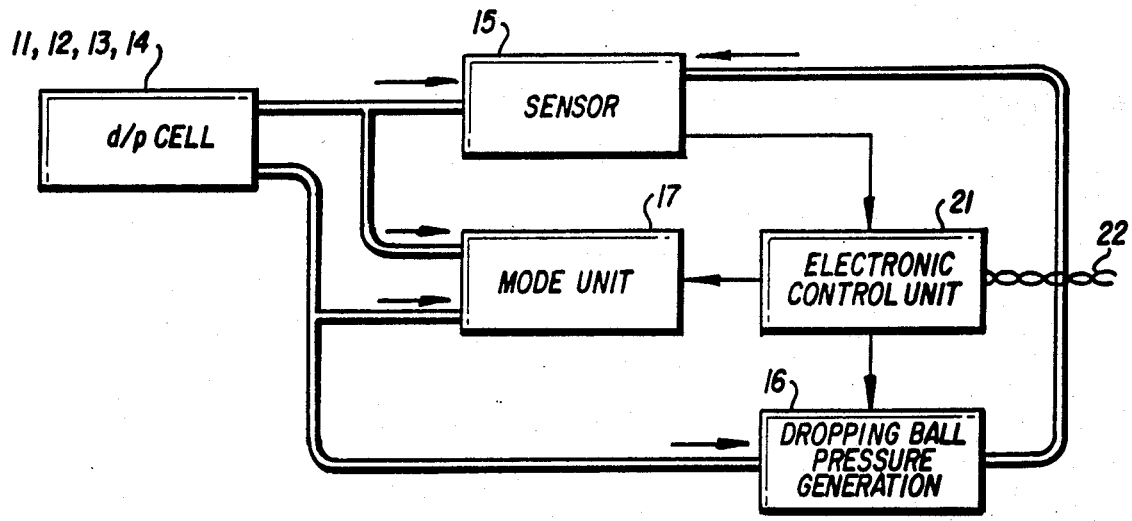
FIG. 1 is a schematic diagram which illustrates a simplified pressure calibration apparatus according to the present invention.

Referring now to the drawings in detail, there is illustrated in FIG. 1 the field-based pressure calibration apparatus of this invention designated generally by the numeral 10. The calibration apparatus 10 consists of five main units: two process diaphragms 11, 13 and corresponding backup plates 12, 14, a differential pressure sensor 15, a dropping ball and weight unit 16, an electronics package 21, and mode unit 17.

Figure 2:
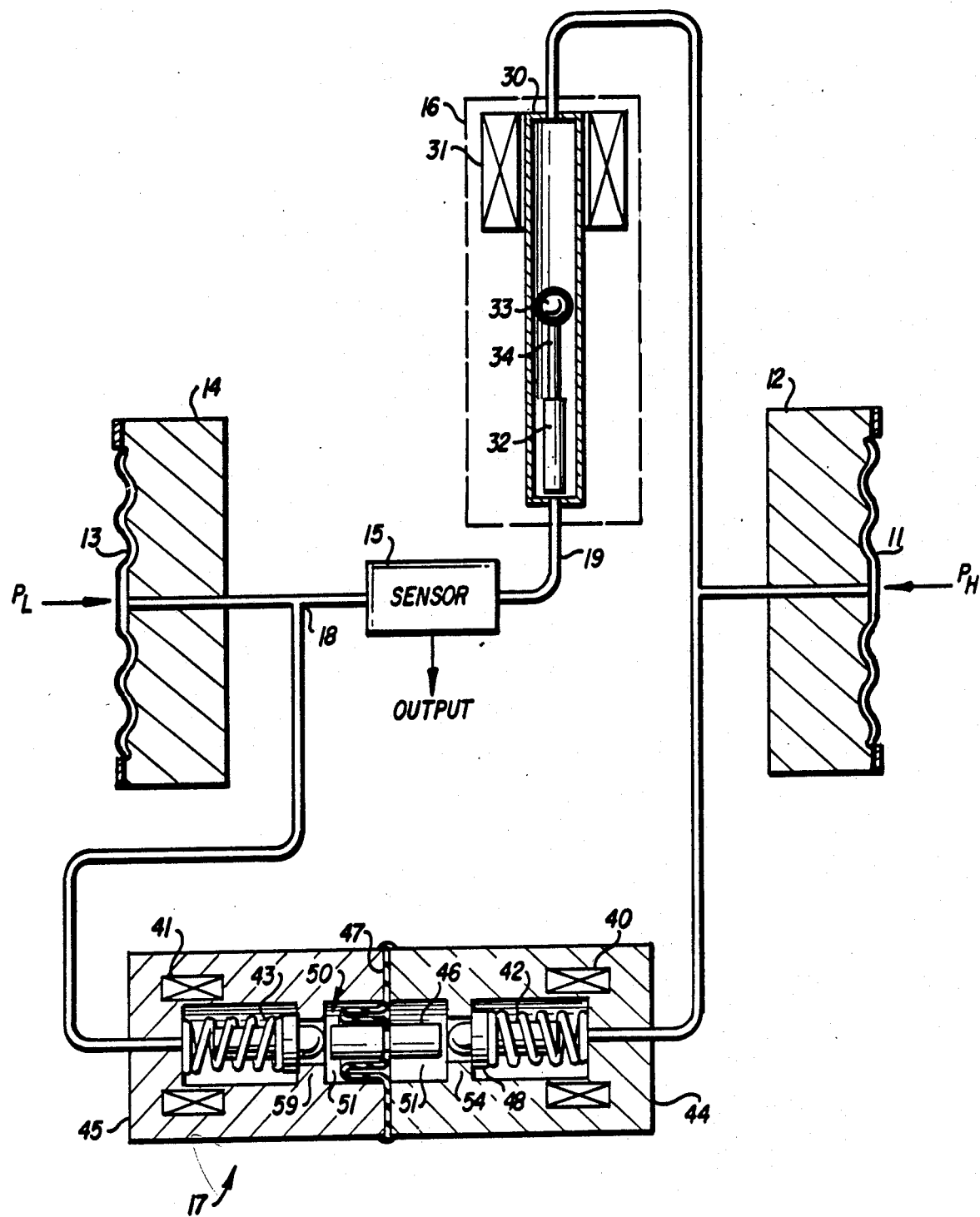
FIG. 2 is a schematic diagram which illustrates details of the pressure calibration apparatus of this invention in sectional view.

Turning to FIG. 2, there is shown a more detailed view of the pressure calibration apparatus 10 according to the present invention. It consists of a first ("high side") process diaphragm 11, a second, "low side" process diaphragm 13, and their respective backup plates 12, 14. The designations "high side" and "low side" are for the present example only. Process diaphragms are common to most differential process measurement devices. Those of ordinary skill in the art are familiar with such devices.

The differential pressure sensor unit 15 may be almost any conventional differential pressure measuring unit. The sensor includes a signal transmitter, and could, for example but not by limitation, be based on a piezoresponsive chip, a resonant element, a capacity-based sensor, or other of the known sensor types. Due to the functioning of the mode unit 17, overrange protection is not ordinarily needed in the sensor unit. The sensor 15 would ordinarily include a differential pressure input and electrically based signal output.

It is desirable to have the volume spring rate of the sensor as high as possible. A microsensor "chip" is thus a desirable choice for the sensor.

Dropping ball and weight unit 16 may be illustrated by previously referenced U.S. Pat. Nos. 4,638,656 and 4,604,891, to Sgourakes, et al, both of which are hereby incorporated by reference. The latter device may be used to provide two or more timed-sequence calibration signal levels. In the present FIG. 2 embodiment, ball and weight unit 16 is one example of means for selectively applying a predetermined magnitude reference pressure in the apparatus. It includes a chamber 30 containing ball 33 and weight 32 connected by a shaft 34. The ball 33 diameter is selected to be a close fit within the chamber, while the weight 32 diameter is smaller, permitting free fall of the weight. Coil 31 is connected to and energized by electronic control unit 21 (not shown). The chamber is in communication with pathways 19, 20.

In the present disclosure the electronic control unit 21 is generically described on a functional basis as details of the design of such are believed within the skill of an ordinary electronic engineering artisan. The electronics control unit 21 functions on line 25 include: excitation of the sensor, sensing the measurement output signal value of the sensor, storage of this measurement value if desired, and transmission of same to a receiver at the control room via line 22, which may be remotely located. Also required is circuitry to perform the various self-calibration and control switching operations to be described hereinafter. See FIG. 3. The electronics control unit also provides needed electrical power. Electrical power may be derived either from the information transmission wires cabled to the receiver, from the control room directly and/or from other devices, such as batteries or energy transducers.

The mode unit 17 is shown merely as a "block" in FIG. 1; it is shown in greater detail in FIG. 2. Mode unit 17 is an electromechanical apparatus that places the transmitter in one of three modes: (1) unenergized (normal differential pressure measurement and transmission), (2) automatic zero scale calibration, or (3) automatic span calibration. The electronics package (shown in FIG. 3) issues the commands to the mode unit and to the dropping ball unit.

Referring again to FIG. 2, it can be seen that the body of mode unit 17 consists of two halves, first base block 44 and second base block 45. Each of these base blocks has a cavity portion (which may be circular) extending nearly but not all of its entire length to form cavity 50, the opposing ends being closed. Base blocks 44, 45 are joined at the center, where a third diaphragm 47 is included to separate the cavity into two portions and to seal the two portions from each other. Diaphragm 47 is attached at its center or alternatively extends through floating diaphragm block 46. Block 46 may also be formed of two elongated joined sections with the diaphragm fixed therebetween. Diaphragm block 46 should move freely in a fill fluid 51 in the central cavity 50 formed by the first and second base blocks 44, 45. Block 46 can be made of any non-magnetic material; plastic, for example, would be desirable.

Third diaphragm 47 requires careful manufacture. As shown in FIG. 2, the diaphragm is generally planar, thin, and includes at least one deep ribbed circular central portion for facilitating movement perpendicular to the plane. The shape shown is suggested, although other shapes could be used. The diaphragm 47 should preferably have a very low spring rate, and may be made of thin plastic, for example, or other impermeable material. It is only exposed to the clean fill fluid 51, so a wide choice of materials may be used. It will be exposed to pressures which are only slightly above full-scale differential pressure (maximum) in ordinary use; the material selected should withstand the rated temperature of the process fluid. Since it is an uncalibrated system element its effective area can therefore vary slightly without introducing errors. The design of such a diaphragm is within the ordinary skill in the art.

In cavity 50 are two bumper blocks, first bumper block 48 and second bumper block 49. Both of these blocks are to be of ferromagnetic material, for example, iron based. Each respective bumper block is provided with a stop 52, 53 which is held against respective cavity stops 54, 55 by respective first and second compression springs 42, 43. In the following description it will be assumed that diaphragm block 46 is precisely the correct length such that it touches both first and second bumper blocks 48, 49 when each bumper block stop 52, 53 is resting against its respective cavity stop 54, 55. The actual operation is not materially changed if center block 46 is slightly shorter or longer.

First and second electric coils 40, 41 are located within the respective base blocks 44, 45 as shown in FIG. 2.

The volume between first and second diaphragms 11, 13 and communicating pathways 18, 19, and 20 is filled with a fill fluid such as the fill fluid 51 shown in mode unit 17. There are two separate fluid volumes separated by sensor 15 and diaphragm 47. The first volume begins behind first diaphragm 11 and extends both to sensor 15 and to diaphragm 47. In the present FIG. 2 view, this volume is in the right-hand side of the figure. The second volume is from behind second diaphragm 13 and extends both to sensor 15 and to diaphragm 47. It is shown in the left-hand side of the figure.

In the following description which identifies the various modes of transmitter operation, certain details such as the effect of spring rate variation, liquid fill balance, and other variations are not considered. These effects are well-known in the art and are beyond the scope of the claims of the present invention.

In the normal, i.e., differential pressure measurement transmission operating mode, mode unit coils 40 and 41 are not energized. Diaphragm 47 is maintained generally in the center position by the forces of the two spring-loaded bumpers 48, 49. The spring-loading of bumpers 48, 49 is described hereinafter. It is preferred that diaphragm 47 is firmly maintained in the center position. Ball and weight unit 16 coil 31 also is not energized, with the result that ball 33 and weight 32 are at the bottom of their travel in the dropping ball chamber 30.

Diaphragms 11, 13 are subjected to process-applied differential pressure $P_H/P_L$, plus the process static pressure. This process-applied differential pressure is communicated by the connecting pathways 18, 19, and 20 and placed across the sensor 15. The output (which may preferably be an electrical signal output) of sensor 15 is related to the differential pressure and is transmitted by the electronic package as the measured differential pressure value.

Connecting tubes 18, 19, and 20 also communicate the process-applied fluid differential pressure to the mode unit 17, so that the differential pressure appears across diaphragm 47. Diaphragm 47 is held in place by bumpers 48 and 49, which in turn are preloaded respectively by springs 42, 43. The springs 42, 43, which may be compression springs, are designed to exert opposing compression forces such that with the differential pressure not greater than full scale input on diaphragm 47, the springs 42, 43 are not compressed further; therefore diaphragm 47 ordinarily remains relatively fixed in place: no mechanical change occurs within mode unit 17. Thus, the full process differential pressure is applied across sensor 15; the electronics control unit 21 transmits the measured value to the remotely located control room.

In the calibration operating mode examples described hereinafter, when a calibration is to be made the electronics control unit 21 preferably first identifies and stores the then-existing transmitted differential pressure signal. This output signal value may be continuously transmitted to the receiver, control room, or elsewhere, during the calibration procedure. Under such circumstances, if the time to calibrate is not long compared with the process time, the process controller (not shown) ordinarily need not be placed in manual mode.

For an explanation of calibration, consider that the applied differential pressure is zero. To provide a zero reading calibration, the electronics control unit 21 is caused to energize second coil 40 and third coil 41. Ferromagnetic bumper 48 is thus attracted, by electromagnetism, toward second coil 40 (to the right in this illustration) and away from diaphragm block 46. Ferromagnetic second bumper 49 is attracted, by electromagnetism, toward third coil 41 (to the left in this illustration) and away from diaphragm block 46. Diaphragm 47 floats freely and, as its spring rate is inherently low, the diaphragm is moved within the cavity to a position where the differential pressure is zero. Since sensor 15 is connected by the connecting tubes across differential diaphragm 47, the differential pressure across the sensor also becomes zero. Electronics package 21 determines the output value of the sensor 15 and stores the measurement value. The resulting true zero calibration value is ten available for use as a reference to calibrate future measurement values. This true zero calibration value is retained until a subsequent zero calibration is obtained. Second and third coils 40, 41 are then de-energized and the normal pressure and transmit modes resumed. Dropping ball and weight unit 16 is not used in this calibration procedure.

Figure 3:
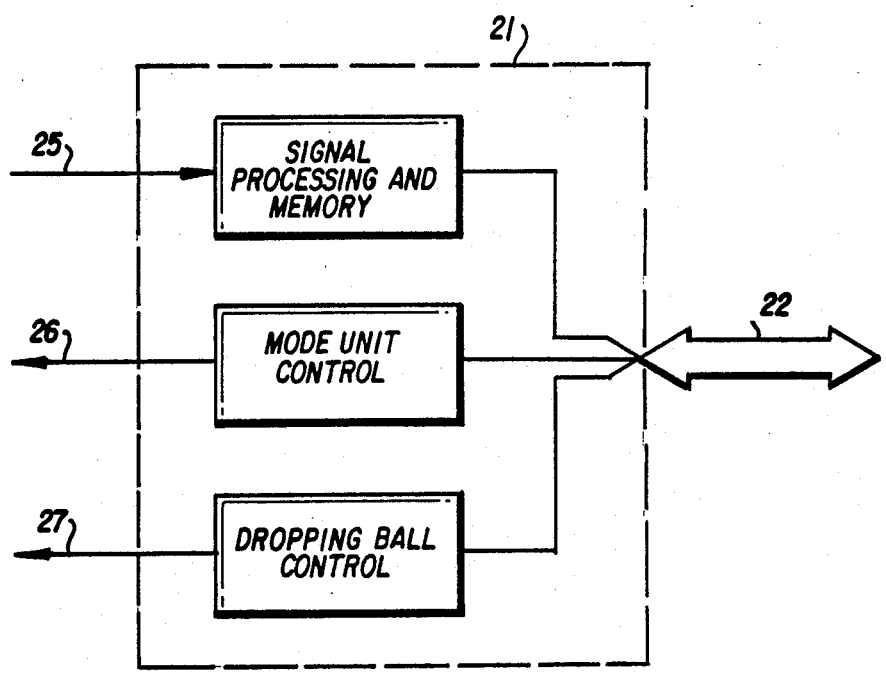
FIG. 3 is a schematic diagram which illustrates the electronics control unit of the invention.

To provide a span measurement calibration, the electronics control unit 21 first energizes second and third coils 40, 41 via line 26 (FIG. 3). Ferromagnetic first bumper block 48 and ferromagnetic second bumper block 49 move oppositely outwards from the center, leaving third diaphragm 47 free to move to a position within the cavity where the differential pressure is zero. Zero differential pressure also exists then at the sensor 15.

Next, first coil 31 in the ball and weight, unit 16 is energized by the electronics control unit via line 27 (FIG. 3) and the electromagnetic force of first coil 31, working on the dropping ball and weight, raises the weight 32 and dropping ball 33. First coil 31 is then de-energized and the ball 33 and weight 32 are permitted to fall in fluid-filled chamber 30, restrained only by the fill fluid and thus creating a reference differential pressure for calibration. Further details of the dropping ball operation are discussed in previously cited U.S. Pat. Nos. 4,638,656 and 4,604,891. The resulting differential pressure $P_H/P_L$ is used as a calibration reference. The $P_H$ pressure is applied to the right side of sensor 15 via pathway 19 in FIG. 2. As diaphragm 47 is slack, the pressure $P_L$ from the top (T) of the dropping ball unit 16 is communicated via pathway 20 to mode unit 17, and via pathway 18 to the left side of sensor 15. The differential pressure created by the dropping ball is thereby applied across sensor 15. In completing the above dropping ball differential pressure sequence, the pressure above ball 33 and weight 32 is low as the ball falls, which draws diaphragm 11 to the backup plate 12. Displaced fill fluid 51 passes through mode unit 17 and moves diaphragm 13 further away from the backup plate 14. The output signal of sensor may be communicated to and stored by the electronics control unit via line 27 (FIG. 3). This span measurement calibration value may be used for calibrating future measurement values for transmission until the next span calibration occurs.

The following is a discussion of the zero calibration procedure in the presence of an applied process differential pressure. For discussion purposes only, a full-scale measurement range from zero to two hundred inches of water is assumed, and at the time of the zero calibration, the applied process differential being measured and transmitted is eighty inches of water.

The electronic control unit 21 (FIGS. 1 and 3) first energizes coils 40 and 41 via line 26, moving bumper blocks 48 and 49 oppositely outward and leaving diaphragm 47 slack within the cavity so the diaphragm is free to move to the zero differential pressure position. As the process high pressure $P_H$ is applied to diaphragm 11 is greater than the process low pressure $P_L$ by eighty inches of water, diaphragm 11 is moved left (in this example) until contacting the backup plate 12. Slack diaphragm 47 moves left in the cavity to accommodate the fluid expelled from between diaphragm 11 and backup plate 12. Diaphragm 47 moves just far enough to the left within the cavity to zero the resulting differential pressure. Fill fluid 51 from the left side of diaphragm 47 is expelled and passes into the space between diaphragm 13 and backup plate 14; zero differential pressure then exists across diaphragm 47. The right side of sensor 15 communicates via pathway 19, dropping ball chamber 30, pathway 20, mode selecting unit 17 and pathway 18 to the left side of sensor 15. Thus both sides of sensor 15 will have the same pressure applied, or zero differential.

The electronics control unit 21 determines the sensor signal value for the zero differential pressure (line 25) and may store that measurement value. This stored value for the calibration measurement may be used as a reference for future transmitted values until a subsequent calibration procedure is completed. Coils 40 41 are then de-energized via line 26, diaphragm 47 is forced back to its central position by the return of bumper blocks 48, 49 under the influence of springs 42, 43. Fill fluid 51 previously displaced by diaphragm 47 is released and moves to the right, being forced into the cavity between diaphragm 11 and backup plate 12. The system may then be returned to the normal measurement and transmit mode.

The sensor 15 zero signal value for the applied differential process pressure is the same as the value derived for the zero at zero differential applied process pressure calibration. The presence of the process applied differential pressure is temporarily negated by the zeroing procedure.

Following is a discussion of a span calibration procedure in the presence of a process-applied differential pressure. For discussion purposes only, a full-scale measurement range from zero to two hundred inches of water is assumed. It is also assumed, for example only, that at the time of the zero calibration procedure, an applied process differential pressure of eighty inches of water is being measured.

First, the electronics control unit 21 (FIGS. 1 and 3) may store the sensor 15 output signal value (currently eighty inches of water) for the differential pressure measurement at the time of the measurement line 25. Next, the electronics control unit 21 energizes both coils 40, 41 via line 26, moving bumper blocks 48, 49 oppositely outward and leaving diaphragm 47 slack in the cavity, so it will readily move to the position that results in zero differential pressure across it. As the process high pressure $P_H$ is greater than the process low pressure $P_L$ (by eighty inches of water in this example), diaphragm 11 is moved left until it contacts backup plate 12. Slack diaphragm 47 moves to accommodate the fluid 51 expelled from between diaphragm 11 and backup plate 12. Diaphragm 47 thus moves far enough to the left to zero the differential pressure across diaphragm 47. Fill fluid 51 from cavity 50 behind diaphragm 47 is expelled and passes into the space between diaphragm 13 and its backup plate 14. Zero differential pressure then exists across diaphragm 47. The right side of sensor 15 communicates via pathway 19, dropping ball chamber 30, pathway 20, mode unit 17, and pathway 18 to the left side of sensor 15. Thus, both sides of sensor 15 will be subjected to the same applied pressure, which is equal to zero differential. Next, dropping ball and weight unit 16, coil 31 is energized via line 27; the electromagnetic force exerted on ball 33 and weight 32, raises the weight 32 and the dropping ball 33 in chamber 30. Coil 31 is then de-energized and the ball and weight 33, 32 are permitted to fall, creating thereby a reference differential pressure. The resulting differential pressure $P_H/P_L$ is used for a calibration reference. The $P_H$ pressure from below the ball and weight 33, 32 is applied to the right side of the sensor 15. As diaphragm 47 is slack in the cavity, the pressure $P_L$ from the top of the dropping ball tube is communicated via pathway 20, mode unit 17, and pathway 18 into the left side of sensor 15. Thus, the differential pressure created by the dropping ball is applied across sensor 15. This electrical output signal value of sensor 15 is communicated to and may be stored by the electronics control unit 21 as the span calibration measurement. This span measurement value may be used for calibrating future span measurements until the next span calibration procedure occurs.

Finally, coils 40 and 41 are de-energized and the unit returns to transmitting the differential pressure in the normal measure and transmit mode.

A one-sided overrange process pressure may be applied, such as when the process high pressure $P_H$ and the process low pressure $P_L$ differ from one another by a value that exceeds, for this example, 120 percent of full-scale range of the transmitter. Differential overpressure, for this example, includes all differentials from 120 percent full-scale measurement to the full-scale static pressure rating of the transmitter. Again, a full-scale measurement range of the transmitter of two hundred inches of water is assumed.

Overrange protection is achieved by mode unit 17. (Sensor 15 does not require a additional overrange protection.) The following illustrative discussion explains how mode unit 17 provides this overrange protection. Compression springs 42, 43 are selected such that they do not compress for a full-scale differential pressure applied across diaphragm 47. When a differential pressure of about 120 percent of the full scale range is applied across diaphragm 47, the force will be great enough to further compress the springs beyond the ordinary compression values.

For this example, assuming a gradual increase in the differential pressure is applied to diaphragm 11: as the differential pressure increases on diaphragm 47, an increasing value of measurement is made. Diaphragm 47 remains fixed in position by the force of compression spring 43. When the applied differential pressure reaches a value in excess of the chosen cutoff level, such as the 120 percent of the full-scale measurement rating, the force on diaphragm 47 pushing to the left becomes sufficient to begin further compression of spring 43. The resulting compression allows diaphragm 47 to move further to the left. Fill fluid 51 now flows out of the cavity between diaphragm 11 and the backup plate 12 to fill the increased cavity volume to the right of diaphragm 47. Compression of spring 43 continues with an increasing process applied differential pressure until diaphragm 11 reaches backup plate 12.

As diaphragm 47 moves to the left in the cavity, the fill fluid 51 on its left is deposited between diaphragm 13 and backup plate 14. When diaphragm 11 reaches backup plate 12, all motion stops. Thus the differential pressure applied across a sensor 15 may reach about 150 percent of full scale measurement. As diaphragm 11 has then reached backup plate 12, a further increase in the pressure applied to the diaphragm up to the static pressure limit simply has no further effect. Note that application of overrange pressure on diaphragm 13 would result in an action the reverse of that just described. Sensor 15 is thus protected against being subjected to a differential pressure greater than about 150 percent of the full-scale rating. These values are given solely for illustration; actual values will vary in each situation. Design considerations for the actual use would establish the actual values; these design considerations are well-known to persons of ordinary skill in the art.

While there have been shown and described what are at present considered to be the preferred embodiments of the invention, it will be apparent to those skilled in the art that various changes and modifications can be made therein without departing from the scope of the invention defined by the appended claims.

I claim:

1. Mode unit for use in a differential pressure calibrator apparatus, said mode unit comprising:
   a housing having a central cavity in said housing; flexible movable diaphragm means located in said central cavity for dividing said central cavity into first and second portions thereof; diaphragm block means divided by said diaphragm, centrally located in said cavity portions; first and second bumper means respectively positioned within said first and second cavity portions, for restraining movement of said diaphragm block means; first and second spring means respectively positioned within said first and second cavity portions, for urging said respective first and second bumper means into contact with said diaphragm block means; first and second electromagnet means respectively associated with said first and second bumper means, for moving each of said bumper means between a normal, unactivated position and an activated, retracted position; fill fluid filling each of said cavity portions; and first and second ports in said housing communicating respectively with said first and second cavity portions.

2. Apparatus as in claim 1, wherein said central cavity is circular in cross-section and elongated.

3. Apparatus as in claim 1, wherein said diaphragm is generally planar and includes deep-ribbed central portions for facilitating movement thereof perpendicular to said plane.

4. Apparatus as in claim 1, wherein said diaphragm has a low spring rate.

5. Apparatus as in claim 1, wherein said diaphragm is made of a material impermeable by said fill fluid.

6. Apparatus as in claim 1, wherein said diaphragm is made of thin polymeric plastic.

7. Apparatus as in claim 1, wherein said diaphragm block is non-magnetic.

8. Apparatus as in claim 1, wherein said bumper means are ferromagnetic.

9. Apparatus as in claim 1, wherein said cavity first and second portions are substantially equal in volume.

* * * * *